United States Patent

Izuki

(10) Patent No.: US 7,820,576 B2
(45) Date of Patent: Oct. 26, 2010

(54) OPTICAL GLASS AND OPTICAL ELEMENT

(75) Inventor: Manabu Izuki, Kobe (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 232 days.

(21) Appl. No.: 12/033,377

(22) Filed: Feb. 19, 2008

(65) Prior Publication Data

US 2008/0207429 A1  Aug. 28, 2008

(30) Foreign Application Priority Data

Feb. 22, 2007  (JP)  ............... 2007-042116

(51) Int. Cl.
 *C03C 3/066* (2006.01)
 *C03C 3/068* (2006.01)
(52) U.S. Cl. ......................... 501/78; 501/79
(58) Field of Classification Search ............... 501/78, 501/79
 See application file for complete search history.

(56) References Cited

U.S. PATENT DOCUMENTS

| 6,645,894 | B2 * | 11/2003 | Endo | 501/51 |
| 7,491,667 | B2 * | 2/2009 | Hayashi | 501/51 |
| 2004/0186003 | A1 * | 9/2004 | Uehara | 501/78 |
| 2005/0204776 | A1 | 9/2005 | Hayashi | 65/102 |

FOREIGN PATENT DOCUMENTS

| CN | 1669966 A | 9/2005 |
| JP | 6-305769 A | 11/1994 |
| JP | 2005-330154 A | 12/2005 |

* cited by examiner

*Primary Examiner*—Karl E Group
(74) *Attorney, Agent, or Firm*—Sidley Austin LLP

(57) ABSTRACT

An optical glass for press-molding contains as glass ingredients, by weight: 0.5-4% $SiO_2$; 20-30% $B_2O_3$; 10-20% ZnO; 1-10% $ZrO_2$; 30-45% $La_2O_3$; 5-12% $Nb_2O_5$; 1-15% $WO_3$; 0.5-3.5% $TiO_2$; 0.5-3% CaO; 0.1-0.5% $Li_2O$; 0-0.4% $Na_2O$ (zero inclusive); and 0-0.4% $K_2O$ (zero inclusive), with the total content of $Li_2O+Na_2O+K_2O$ accounting for 0.1-0.5%.

10 Claims, 1 Drawing Sheet

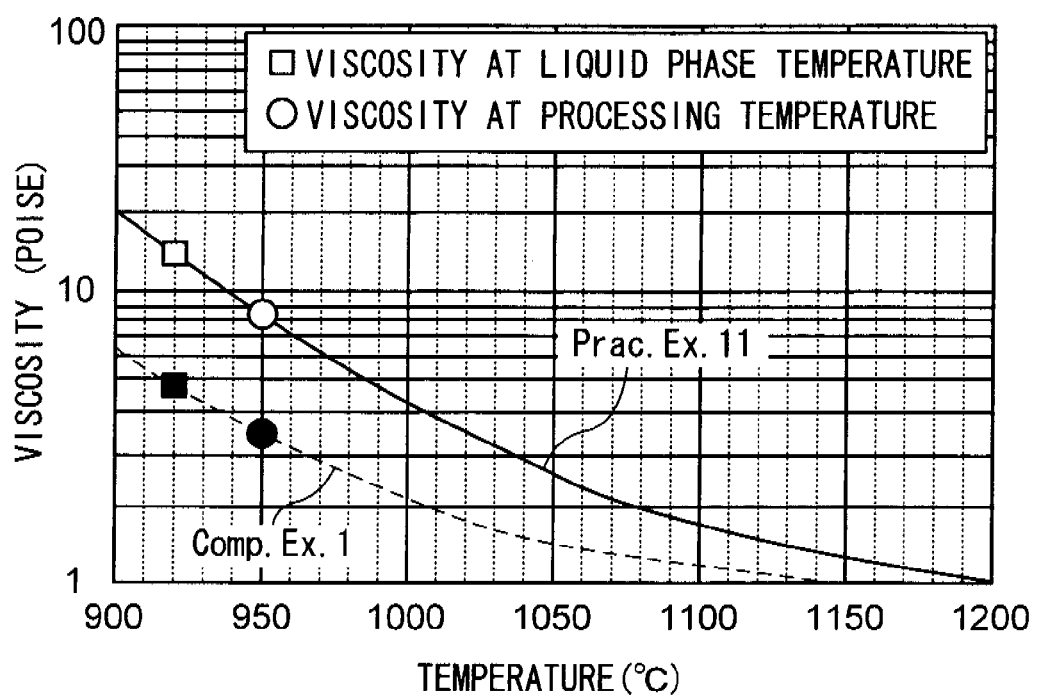

OPTICAL GLASS AND OPTICAL ELEMENT

This application is based on Japanese Patent Application No. 2007-042116 filed on Feb. 22, 2007, the contents of which are hereby incorporated by reference.

BACKGROUND OF THE INVENTION

1. Field of the Invention

The present invention relates to an optical glass and to an optical element formed thereof. More particularly, the invention relates to an optical glass suitable for press-molding and to an optical element formed of such an optical glass.

2. Description of Related Art

One method of fabricating a glass optical element is so-called press-molding, whereby molding is achieved by pressing glass heated to above the yielding temperature (At) thereof between a pair of heated metal molds—an upper and a lower mold. This involves less fabrication steps than other conventional molding methods that involve polishing of glass, and thus allows fabrication with less time and at lower costs. Press-molding has therefore come to be widely employed in recent years to fabricate optical elements such as glass lenses.

There are mainly two types of press-molding: one involving reheating and the other involving direct-pressing. In press-molding of the reheating type, a gob preform or a polished preform having largely the shape of the finished product is prepared, and this preform is then reheated to above the softening point and press-molded between a pair of heated metal molds—an upper and a lower mold—so as to be formed into the shape of the finished product. On the other hand, in press-molding of the direct-pressing type, drops of molten glass from a glass melting furnace are dropped directly into a heated metal mold and is press-molded so as to be formed into the shape of the finished product. In press-molding of either type, when glass is molded, the pressing metal mold needs to be heated to near or above the glass transition temperature (hereinafter also represented by "Tg"). As a result, the higher the Tg of glass, the more prone the pressing metal mold is to surface oxidation and to alteration in the metal composition, and thus the shorter the useful life of the pressing metal mold, resulting in higher fabrication costs. Deterioration of the metal mold may be alleviated by performing molding in an atmosphere of an inert gas such as nitrogen. The control of the atmosphere, however, requires a complicated design in molding equipment, and the use of the inert gas incurs a running cost, leading to higher fabrication costs. Thus, it is desirable that glass used in press-molding have as low a Tg as possible. In addition, from the viewpoint of enhanced resistance to devitrification, it is desirable that not only the Tg but also the liquid phase temperature (hereinafter also represented by "$T_L$") of the glass be as low as possible.

Accordingly, various technologies for lowering the Tg and $T_L$ of glass without using a lead compound have been studied and proposed, of which examples are disclosed in JP-A-2005-330154, US 2005/0204776 A1, and JP-A-H06-305769.

Inconveniently, however, the optical glasses proposed in the documents mentioned above achieve a low Tg and a low $T_L$ through addition of large amounts of alkali ingredients, and thus have low viscosity, for example, at the nozzle temperature during dropping of glass for direct press-molding. This often makes it difficult to drop the glass through the nozzle, and makes the dropped glass lie flat on the metal mold, making it difficult to mold.

SUMMARY OF THE INVENTION

The present invention has been devised to address the inconveniences mentioned above, and it is an object of the invention to provide an optical glass that has a low Tg and a low $T_L$ and that in addition has viscosity suitable for press-molding.

It is another object of the invention to provide an optical element that has high-refraction, low-dispersion optical constants and that offers high productivity.

To achieve the above object, the inventor has made intensive studies and found out that it is possible to obtain viscosity suitable for press-molding while maintaining predetermined optical constants by adopting a basic composition containing $B_2O_3$—ZnO—$La_2O_3$—$Nb_2O_5$—$WO_3$, optimizing the contents of these main ingredients, and controlling the contents of alkali and other glass ingredients. This finding has led to the present invention.

Specifically, according to one aspect of the invention, an optical glass for press-molding contains as glass ingredients, by weight: 0.5-4% $SiO_2$; 20-30% $B_2O_3$; 10-20% ZnO; 1-10% $ZrO_2$; 30-45% $La_2O_3$; 5-12% $Nb_2O_5$; 1-15% $WO_3$; 0.5-3.5% $TiO_2$; 0.5-3% CaO; 0.1-0.5% $Li_2O$; 0-0.4% $Na_2O$ (zero inclusive); and 0-0.4% $K_2O$ (zero inclusive), with the total content of $Li_2O+Na_2O+K_2O$ accounting for 0.1-0.5%. In the following description, all percentage (%) values are in percent (%) by weight, unless otherwise stated.

From the viewpoints of enhanced glass stability and control of optical constants, the above optical glass may further contain one or two or more of the following glass ingredients: 0-3% $Al_2O_3$; 0-5% $GeO_2$; 0-3% SrO; 0-3% BaO; 0-3% $Bi_2O_3$; and 0-0.5% $Sb_2O_3$.

From the viewpoints of melt productivity and moldability, it is preferable that the above optical glass have: an index of refraction ($n_d$) in the range of 1.81 to 1.85; an Abbe number ($v_d$) in the range of 36 to 40; a liquid phase temperature ($T_L$) of 950° C. or less; a glass transition temperature (Tg) of 590° C. or less; and a specific gravity (ρ) of 4.6 g/cm³.

According to another aspect of the invention, an optical element is formed of the above optical glass. Preferred examples of optical elements so formed are lenses, prisms, and mirrors.

Optical glasses according to the invention contain definite contents of predetermined glass ingredients; they thereby offer high-refraction, low-dispersion optical constants, a low Tg and a low $T_L$, and viscosity suitable for press-molding.

Optical elements according to the invention are formed by press-molding such optical glasses; they thus have the properties of those optical glasses, and offer high production efficiency combined with low costs.

BRIEF DESCRIPTION OF THE DRAWINGS

FIG. 1 is a graph showing the viscosity curves of the optical glasses of Practical Example 11 and Comparative Example 1.

DETAILED DESCRIPTION OF PREFERRED EMBODIMENTS

The grounds on which the contents of different ingredients in an optical glass according to the invention are controlled as described above will be described below. First, $SiO_2$ is an essential glass ingredient in the invention; adding a small amount of it helps stabilize the glass, and helps enhance the viscosity and durability of the glass. These effects, however, are not obtained with a $SiO_2$ content under 0.5%. On the other hand, a $SiO_2$ content over 4% results in unsatisfactory resistance to devitrification. Hence, the $SiO_2$ content is controlled to be in the range of 0.5-4%. A more preferred content of $SiO_2$ is in the range of 1-4%.

$B_2O_3$, which forms the skeleton of glass, is another essential glass ingredient in the invention; it greatly contributes to stabilizing the glass. A $B_2O_3$ content under 20% makes the glass unstable, and results in unsatisfactory resistance to devitrification. On the other hand, a $B_2O_3$ content over 30% results in a low index of refraction, making it impossible to obtain desired optical constants. Hence, the $B_2O_3$ content is controlled to be in the range of 20-30%. A more preferred content of $B_2O_3$ is in the range of 20-27%.

ZnO is another essential glass ingredient in the invention; it has the effect of lowering Tg while keeping the thermal expansion coefficient small. This effect cannot be obtained with a ZnO content under 10%. On the other hand, a ZnO content over 20% results in a low index of refraction, making it impossible to obtain desired optical constants, and also results in unsatisfactory resistance to devitrification. Hence, the ZnO content is controlled to be in the range of 10-20%. A more preferred content of ZnO is in the range of 12-18%.

$ZrO_2$ is another essential glass ingredient in the invention; it has the effects of increasing the index of refraction and enhancing the durability of the glass. These effects cannot be obtained with a $ZrO_2$ content under 1%. On the other hand a $ZrO_2$ content over 10% greatly degrades the meltability of the glass and the resistance to devitrification thereof. Hence, the $ZrO_2$ content is controlled to be in the range of 1-10%. A more preferred content of $ZrO_2$ is in the range of 1-6%.

$La_2O_3$ is another essential glass ingredient in the invention; it has the effects of increasing the index of refraction of the glass and reducing the dispersion thereof. A $La_2O_3$ content under 30% makes it impossible to obtain desired optical constants. On the other hand, a $La_2O_3$ content over 45% results in a high Tg and unsatisfactory resistance to devitrification. Hence, the $La_2O_3$ content is controlled to be in the range of 30-45%. A more preferred content of $La_2O_3$ is in the range of 32-42%.

$Nb_2O_5$ is another essential glass ingredient in the invention; it has the effects of increasing the index of refraction of the glass and enhancing the resistance to devitrification thereof. A $Nb_2O_5$ content under 5% results in a low index of refraction, making it impossible to obtain desired optical constants. On the other hand, a $Nb_2O_5$ content over 12% results in a small Abbe number, making it difficult to obtain desired optical constants. Hence, the $Nb_2O_5$ content is controlled to be in the range of 5-12%. A more preferred content of $Nb_2O_5$ is in the range of 7-10%.

$WO_3$ is another essential glass ingredient in the invention; it has the effects of increasing the index of refraction of the glass while minimizing an increase in Tg, and of greatly enhancing the resistance to devitrification. These effects cannot be obtained with a $WO_3$ content under 1%. On the other hand, a $WO_3$ content over 15% results in a small Abbe number, making it difficult to obtain desired optical constants, and also results in the glass being unsatisfactorily tintable and having a large specific gravity. Hence, the $WO_3$ content is controlled to be in the range of 1-15%. A more preferred content of $WO_3$ is in the range of 5-12%.

$TiO_2$ is another essential glass ingredient in the invention; it has the effects of increasing the index of refraction and enhancing the resistance to devitrification. These effects cannot be obtained satisfactorily with a $TiO_2$ content under 0.5%. On the other hand, a $TiO_2$ content over 3.5% results in a small Abbe number and also results in the glass being unsatisfactorily tintable. Hence, the $TiO_2$ content is controlled to be in the range of 0.5-3.5%. A more preferred content of $TiO_2$ is in the range of 0.5-3%.

CaO is another essential glass ingredient in the invention; it has the effects of enhancing the meltability of the glass and reducing the specific gravity thereof. CaO can also be used to control the optical constants of the glass. These effects cannot be obtained with a CaO content under 0.5%. On the other hand, a CaO content over 3% results in unsatisfactory resistance to devitrification, and also results in a low index of refraction, making it impossible to obtain desired optical constants. Hence, the CaO content is controlled to be in the range of 0.5-3%. A more preferred content of CaO is in the range of 0.5-2%.

$Li_2O$ is another essential glass ingredient in the invention; it has the effect of greatly reducing Tg, and adding a small amount of it helps stabilize the glass. $Li_2O$ also has the effect of reducing the specific gravity of the glass. These effects cannot be obtained with a $Li_2O$ content under 0.1%. On the other hand, a $Li_2O$ content over 0.5% results in the glass having so low viscosity that it is impossible to obtain the viscosity needed for press-molding. Hence, the $Li_2O$ content is controlled to be in the range of 0.1-0.5%. A more preferred content of $Li_2O$ is in the range of 0.1-0.3%.

The effects of $Na_2O$ and $K_2O$ are similar to those of $Li_2O$. A $Na_2O$ content over 0.4%, or a $K_2O$ content over 0.4%, however, results in the glass having so low viscosity that it is impossible to obtain the viscosity needed for press-molding. Hence, the content of the $Na_2O$ and the content of $K_2O$ are each controlled to be in the range of 0-0.4% (zero inclusive).

A total content of $R_2O$ (where R=Li, Na, and K) under 0.1% results in an insufficient effect of reducing Tg. On the other hand, a total content of $R_2O$ over 0.5% results in the glass having so low viscosity that it is impossible to obtain the viscosity needed for press-molding. Hence, the total content of $R_2O$ is controlled to be in the range of 0.1-0.5%. A more preferred total content of $R_2O$ is in the range of 0.1-0.3%.

An optical glass according to the invention may further contain predetermined amounts of one or two or more of the following glass ingredients: $Al_2O_3$, $GeO_2$, SrO, BaO, $Bi_2O_3$, and $Sb_2O_3$. Now, why these are preferred additional ingredients will be described.

$Al_2O_3$ has the effect of enhancing the durability of the glass. An $Al_2O_3$ content over 3%, however, results in the glass having unsatisfactory meltability and unsatisfactory resistance to devitrification. Hence, the $Al_2O_3$ content is controlled to be in the range of 0-3%. A more preferred content of $Al_2O_3$ is in the range of 0-2%.

$GeO_2$ has the effect of enhancing the index of refraction. A $GeO_2$ content over 5%, however, results in unsatisfactory resistance to devitrification. Hence, the $GeO_2$ content is controlled to be in the range of 0-5%. A more preferred content of $GeO_2$ is in the range of 0-2%.

SrO and BaO are used to control optical constants. A SrO content over 3%, or a BaO content over 3%, however, results in unsatisfactory resistance to devitrification, and also results in low optical constants, making it impossible to obtain desired optical constants. Hence, the SrO content and the BaO content are each controlled to be in the range of 0-3%. A more preferred content of each of SrO and BaO is in the range of 0-2%.

$Bi_2O_3$ has the effects of increasing the index of refraction of the glass without increasing Tg and of enhancing the resistance to devitrification. A $Bi_2O_3$ content over 3%, however, results in the glass being unsatisfactorily tintable. Hence, the $Bi_2O_3$ content is controlled to be in the range of 0-3%.

Adding a small amount of $Sb_2O_3$ helps obtain an enhanced clarifing action. Hence, the $Sb_2O_3$ content is controlled to be in the range of 0-0.5%. A clarifing action may instead be obtained by use of $Li_2CO_3$.

Needless to say, an optical glass according to the invention may further contain other well-known glass ingredients and additives such as $Y_2O_3$, $Gd_2O_3$, $Ta_2O_5$, and CuO so long as these do not spoil the effects of the invention.

An optical element according to the invention is fabricated by press-molding an optical glass according to the invention as described above. The press-molding employed here may be, for example, direct press-molding, in which molten glass is dropped from a nozzle into a metal mold heated to a predetermined temperature to achieve press-molding, or reheating press-molding, in which a preform placed on a metal mold is heated to above the glass softening point to achieve press-molding. Any of these and like methods eliminates the need for grinding and polishing, helps enhance productivity, and makes it possible to fabricate optical elements having difficult-to-work shapes such as free-form curved surfaces and aspherical surfaces.

Desirable molding conditions differ depending on the ingredients of glass and the shape of the molded product. Generally, a preferred temperature of the metal mold is in the range of Tg to (Tg+30)° C., more preferably in a temperature range close to the glass transition temperature. A preferred pressing duration is in the range of several seconds to several tens of seconds. A preferred pressing pressure is in the range of $2 \times 10^7$ N/m² to $6 \times 10^7$ N/m², varying according to the shape and size of the optical element fabricated. The higher the pressure of pressing, the higher the accuracy of molding. The glass viscosity necessary for direct press-molding is in the range of 7 to 30 poise. Suitable as the metal mold is one that is formed of heat-resistant ceramic, such as SiC, and of which the surface is coated with a mold release agent such as diamondlike carbon.

Optical elements according to the invention find uses as, for example, lenses in digital cameras; collimator lenses, prisms, and mirrors in laser beam printers; and the like.

EXAMPLES

Hereinafter, the invention will be described more specifically by way of practical examples. These examples, however, are not meant to limit the invention in any way.

For each of Practical Examples (Prac. Ex.) 1 to 11 and Comparative Examples (Comp. Ex.) 1-3, a sample was prepared in the following manner. Common glass materials—oxides, hydroxides, carbonates, nitrates, etc.—were blended to have the corresponding one of the target compositions shown in Table 1 and 2, were then well mixed in powder form to obtain a blended source material. This was then put in a melting furnace heated to 1200-1400° C. There, the mixture was melted, fined down, and agitated to be homogenized. The melt was then poured into a preheated metal casting mold, and was then gradually cooled down to room temperature to obtain a sample. With each sample, the index of refraction ($n_d$), the Abbe number ($v_d$), the liquid phase temperature ($T_L$), the glass transition temperature (Tg), the yielding temperature (At), the linear expansion coefficient ($\alpha$), and the specific gravity were measured. The measurement results are shown, together with the compositions, in Tables 1 and 2.

Incidentally, Comparative Examples 1 to 3 are, respectively, re-creations of Example 22 disclosed in JP-A-2005-330154 mentioned earlier, Example 16 of US 2005/0204776 A1 mentioned earlier, and Example 5 of JP-A-H06-305769 mentioned earlier.

The above-mentioned properties were measured by methods complying with the Japan Optical Glass Industry Standard (JOGIS). Specifically, the different properties were measured in the following manners:
(a) Index of Refraction (nd) and Abbe Number (vd)

These were measured, using a "KPR-200" precision refractometer manufactured by Kalnew Kogaku Kogyo Co. Ltd., on the sample obtained after, as described above, the molten glass poured into a casting mold was gradually cooled down to room temperature at a rate of $-30°$ C. per hour.
(b) Glass Transition Temperature (Tg), Yielding Temperature (At), and Linear Expansion Coefficient ($\alpha$), These were measured, using a "TMA/SS6000" thermomechanical analyzer manufactured by Seiko Instruments Inc., while temperature is raised at a rate of 5° C. per minute. The linear expansion coefficient is that as observed in the temperature range of 100 to 300° C.
(c) Liquid Phase Temperature ($T_L$)

The glass was put in a 50 cc platinum crucible and was left for 10 hours inside an electric furnace kept at a predetermined temperature. Thereafter, the glass was poured into a casting mold to produce a glass block, which was then inspected for devitrification (crystal formation) under a "BX50" optical microscope manufactured by Olympus Corporation, at a magnification of 100×.
(d) Specific Gravity This was measured by the Archimedean method.

As will be clear from Table 1, the optical glasses of Practical Examples 1 to 11 have high-refraction, low-dispersion optical constants, with indices of refraction of 1.811 to 1.846 and Abbe numbers of 36.0 to 40.1. In addition, with glass transition temperatures (Tg) of 589° C. or less, they are suitable for press-molding. Furthermore, with liquid phase temperatures ($T_L$) of 950° C. or less, linear expansion coefficients ($\alpha$) of 77 or lower in the temperature range of 100 to 300° C., and specific gravities of 4.57 g/cm³ or less, they are excellent in moldability and other properties.

By contrast, Table 2 shows the following. The optical glass of Comparative Example 2, which contains no alkali ingredients, has a liquid phase temperatures ($T_L$) as high as 1020° C.; it also has a specific gravity as high as 4.86 g/cm³, disadvantageously making it extremely heavy when formed into a large-diameter taking lens. The optical glass of Comparative Example 3, in which the $SiO_2$ and $B_2O_3$ contents are as low as 8.5% and 18.5% respectively, has a liquid phase temperatures ($T_L$) as high as 1050° C. and has unsatisfactory resistance to devitrification.

The optical glass of Comparative Example 1 exhibits no unsatisfactory properties in terms of the values listed in Table 2, but its viscosity is not suitable for press-molding. FIG. 1 shows the viscosity curves of Practical Example 11 and Comparative Example 1. In FIG. 1, the viscosity of each optical glass is plotted against temperature, with the vertical axis representing viscosity and the horizontal axis representing temperature. The optical glass of Practical Example 11 has a liquid phase temperatures ($T_L$) of 920° C., at which it has viscosity of about 15 poise; at the processing temperature (the temperature at which the nozzle is kept during dropping of glass, specifically $T_L+30°$ C.), that is, at 950° C., it has viscosity of about 9 poise. Thus, the optical glass of Practical Example 11 has viscosity suitable for direct press-molding. By contrast, the optical glass of Comparative Example 1, in which the $Li_2O$ content is as high as 2.0%, has viscosity of about 5 poise at its liquid phase temperatures ($T_L$) of 920° C., and has viscosity as low as 3 to 4 poise at the processing temperature of 950° C. Thus, the optical glass of Comparative Example 1 is unsuitable for direct press-molding.

TABLE 1

Unit: % by Weight

| Practical Example | 1 | 2 | 3 | 4 | 5 | 6 | 7 | 8 | 9 | 10 | 11 |
|---|---|---|---|---|---|---|---|---|---|---|---|
| $SiO_2$ | 2.0 | 3.0 | 1.0 | 0.5 | 1.5 | 1.5 | 1.0 | 3.0 | 2.0 | 0.7 | 2.5 |
| $B_2O_3$ | 21.0 | 22.0 | 21.0 | 24.0 | 22.2 | 24.3 | 23.5 | 22.0 | 23.5 | 23.5 | 24.0 |
| $Al_2O_3$ | | | | | | | 1.0 | | | | |
| $GeO_2$ | | | 2.0 | | | | | | | 3.0 | |
| $Li_2O$ | 0.2 | 0.3 | 0.2 | 0.3 | | 0.4 | 0.3 | 0.5 | 0.3 | 0.1 | 0.1 |
| $Na_2O$ | | | | | 0.1 | | | | | | 0.2 |
| $K_2O$ | | | 0.2 | | | | 0.1 | | | 0.2 | |
| $Li_2O + Na_2O + K_2O$ | 0.2 | 0.3 | 0.4 | 0.3 | 0.3 | 0.4 | 0.4 | 0.5 | 0.3 | 0.3 | 0.3 |
| CaO | 0.8 | 1.2 | 2.0 | 1.2 | 2.0 | 0.5 | 1.5 | 0.7 | 1.5 | 3.0 | 0.5 |
| SrO | | | | 0.3 | | | | | | | 1.0 |
| ZnO | 15.0 | 18.0 | 13.0 | 15.0 | 15.0 | 12.0 | 18.0 | 11.5 | 16.2 | 12.0 | 15.0 |
| $ZrO_2$ | 5.0 | 3.0 | 6.0 | 1.5 | 5.0 | 1.8 | 1.1 | 3.5 | 2.0 | 3.0 | 2.0 |
| $TiO_2$ | 1.0 | 0.5 | 0.6 | 1.2 | 3.0 | 1.0 | 1.5 | 2.5 | 1.0 | 0.5 | 0.7 |
| $La_2O_3$ | 35.0 | 37.0 | 36.0 | 40.0 | 33.0 | 37.5 | 35.0 | 38.3 | 36.0 | 32.0 | 36.0 |
| $Nb_2O_5$ | 8.0 | 6.0 | 11.0 | 6.0 | 8.0 | 6.0 | 7.0 | 8.0 | 7.0 | 10.0 | 9.0 |
| $WO_3$ | 12.0 | 9.0 | 7.0 | 10.0 | 10.0 | 15.0 | 10.0 | 8.0 | 10.5 | 12.0 | 9.0 |
| $Bi_2O_3$ | | | | | | | | 2.0 | | | |
| $Sb_2O_3$ | | | | | | | | | | | |
| index of Refraction | 1.841 | 1.812 | 1.846 | 1.821 | 1.842 | 1.813 | 1.813 | 1.839 | 1.815 | 1.819 | 1.811 |
| Abbe Number | 37.0 | 40.1 | 37.1 | 39.4 | 36.0 | 38.6 | 38.7 | 36.5 | 39.0 | 37.7 | 39.0 |
| $T_L$ (° C.) | 950 | 930 | 950 | 940 | 930 | 930 | 920 | 930 | 930 | 950 | 920 |
| Tg (° C.) | 583 | 570 | 579 | 574 | 578 | 581 | 572 | 588 | 578 | 584 | 589 |
| At (° C.) | 627 | 614 | 627 | 613 | 622 | 627 | 609 | 624 | 617 | 629 | 632 |
| α | 72 | 76 | 77 | 77 | 76 | 73 | 77 | 76 | 74 | 75 | 75 |
| Specific Gravity | 4.57 | 4.48 | 4.56 | 4.54 | 4.49 | 4.52 | 4.46 | 4.51 | 4.49 | 4.43 | 4.44 |

TABLE 2

Unit: % by Weight

| Comparative Example | 1 | 2 | 3 |
|---|---|---|---|
| $SiO_2$ | 3.0 | | 8.5 |
| $B_2O_3$ | 20.5 | 20.5 | 18.5 |
| $Al_2O_3$ | | | |
| $GeO_2$ | | | |
| $Li_2O$ | 2.0 | | 3.0 |
| $Na_2O$ | | | |
| $K_2O$ | | | |
| $Li_2O + Na_2O + K_2O$ | 2.0 | 0.0 | 3.0 |
| CaO | | | |
| SrO | | | |
| ZnO | 22.0 | 20.6 | 10.0 |
| $ZrO_2$ | | | 5.0 |
| $TiO_2$ | 2.5 | 1.9 | |
| $La_2O_3$ | 28.0 | 31.3 | 32.0 |
| $Nb_2O_5$ | 5.5 | 6.4 | 15.0 |
| $WO_3$ | 10.5 | 8.4 | 2.0 |
| $Sb_2O_3$ | | | |
| $Y_2O_3$ | | | |
| $Gd_2O_3$ | | 10.9 | |
| $Ta_2O_5$ | 6.0 | | 6.0 |
| Index of Refraction | 1.814 | 1.844 | 1.816 |
| Abbe Number | 36.8 | 37.4 | 37.6 |
| $T_L$ (° C.) | 920 | 1020 | 1050 |
| Tg (° C.) | 512 | 572 | 537 |
| At (° C.) | 556 | 614 | 587 |
| α | 81 | 79 | 81 |
| Specific Gravity | 4.42 | 4.86 | 4.26 |

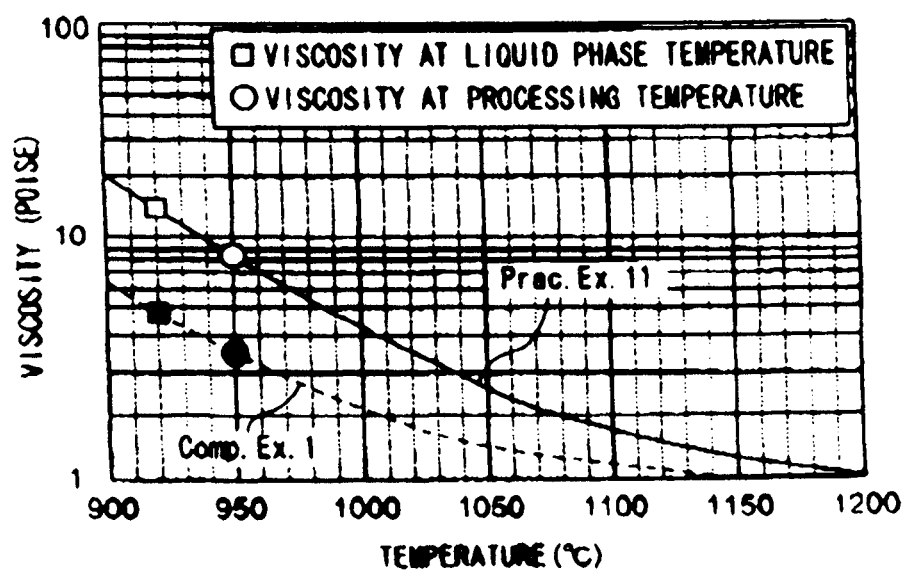

Figure
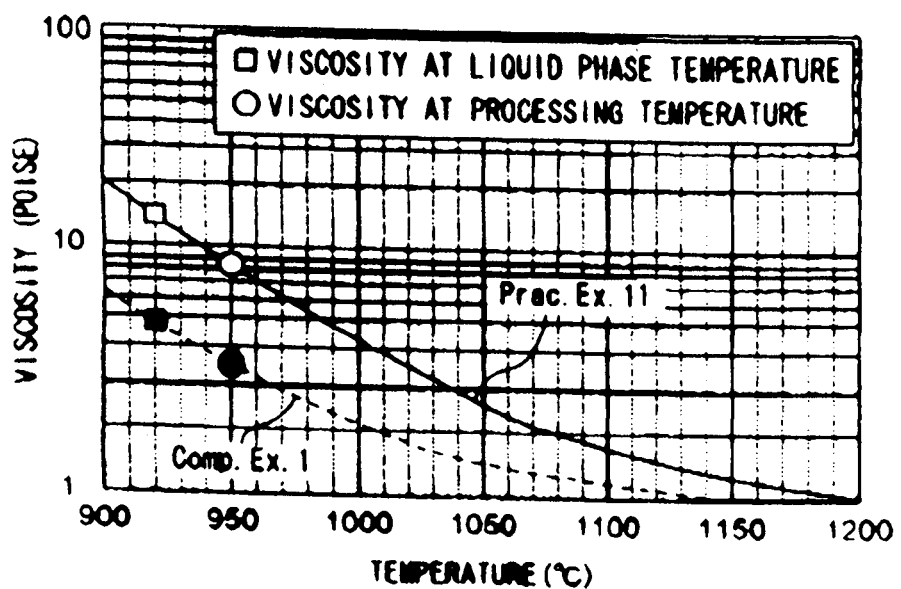

What is claimed is:

1. An optical glass for press-molding, comprising as glass ingredients, by weight:
  0.5-4% $SiO_2$;
  20-30% $B_2O_3$;
  10-20% ZnO;
  1-10% $ZrO_2$;
  30-45% $La_2O_3$;
  9-12% $Nb_2O_5$;
  1-15% $WO_3$;
  0.5-3.5% $TiO_2$;
  0.5-3% CaO;
  0.1-0.5% $Li_2O$;
  0-0.4% $Na_2O$ (zero inclusive); and
  0-0.4% $K_2O$ (zero inclusive),
  with a total content of $Li_2O+Na_2O+K_2O$ accounting for 0.1-0.5%.

2. The optical glass for press-molding according to claim 1, further comprising, by weight:
  0-3% $Al_2O_3$.

3. The optical glass for press-molding according to claim 1, further comprising, by weight:
  0-5% $GeO_2$.

4. The optical glass for press-molding according to claim 1, further comprising, by weight:
  0-3% SrO.

5. The optical glass for press-molding according to claim 1, further comprising, by weight:
  0-3% BaO.

6. The optical glass for press-molding according to claim 1, further comprising, by weight:
  0-3% $Bi_2O_3$.

7. The optical glass for press-molding according to claim 1, further comprising, by weight:
  0-0.5% $Sb_2O_3$.

8. The optical glass for press-molding according to claim 1, wherein the optical glass has
  an index of refraction ($n_d$) in a range of 1.81 to 1.85 and
  an Abbe number ($v_d$) in a range of 36 to 40.

9. The optical glass for press-molding according to claim 1, wherein the optical glass has
  a liquid phase temperature ($T_L$) of 950 ° C. or less,
  a glass transition temperature (Tg) of 590 ° C. or less, and
  a specific gravity (ρ) of 4.6 g/cm$^3$.

10. An optical element formed of the optical glass for press-molding according to claim 1.

* * * * *

UNITED STATES PATENT AND TRADEMARK OFFICE
CERTIFICATE OF CORRECTION

PATENT NO. : 7,820,576 B2
APPLICATION NO. : 12/033377
DATED : October 26, 2010
INVENTOR(S) : Manabu Izuki Page 1 of 3

It is certified that error appears in the above-identified patent and that said Letters Patent is hereby corrected as shown below:

The title page showing the illustrative figure should be deleted to be replaced with the attached title page.

The drawing sheet, consisting of Figure, should be deleted to be replaced with the drawing sheet, consisting of Figure, as shown on the attached page.

Column 2, line 57:
Delete "FIG. 1" and insert -- Figure --.

Column 6, lines 50 and 52:
Delete "FIG. 1" and insert -- Figure --.

Signed and Sealed this
Twenty-ninth Day of March, 2011

David J. Kappos
*Director of the United States Patent and Trademark Office*

(12) United States Patent
Izuki

(10) Patent No.: US 7,820,576 B2
(45) Date of Patent: Oct. 26, 2010

(54) OPTICAL GLASS AND OPTICAL ELEMENT

(75) Inventor: Manabu Izuki, Kobe (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 232 days.

(21) Appl. No.: 12/033,377

(22) Filed: Feb. 19, 2008

(65) Prior Publication Data

US 2008/0207429 A1 Aug. 28, 2008

(30) Foreign Application Priority Data

Feb. 22, 2007 (JP) ............... 2007-042116

(51) Int. Cl.
C03C 3/066 (2006.01)
C03C 3/068 (2006.01)
(52) U.S. Cl. ......................... 501/78; 501/79
(58) Field of Classification Search .............. 501/78, 501/79
See application file for complete search history.

(56) References Cited

U.S. PATENT DOCUMENTS

| 6,645,894 B2* | 11/2003 | Endo | 501/51 |
| 7,491,667 B2* | 2/2009 | Hayashi | 501/51 |
| 2004/0186003 A1* | 9/2004 | Uehara | 501/78 |
| 2005/0204776 A1 | 9/2005 | Hayashi | 65/102 |

FOREIGN PATENT DOCUMENTS

| CN | 1669966 A | 9/2005 |
| JP | 6-305769 A | 11/1994 |
| JP | 2005-330154 A | 12/2005 |

* cited by examiner

Primary Examiner—Karl E Group
(74) Attorney, Agent, or Firm—Sidley Austin LLP

(57) ABSTRACT

An optical glass for press-molding contains as glass ingredients, by weight: 0.5-4% $SiO_2$; 20-30% $B_2O_3$; 10-20% ZnO; 1-10% $ZrO_2$; 30-45% $La_2O_3$; 5-12% $Nb_2O_5$; 1-15% $WO_3$; 0.5-3.5% $TiO_2$; 0.5-3% CaO; 0.1-0.5% $Li_2O$; 0-0.4% $Na_2O$ (zero inclusive); and 0-0.4% $K_2O$ (zero inclusive), with the total content of $Li_2O+Na_2O+K_2O$ accounting for 0.1-0.5%.

10 Claims, 1 Drawing Sheet

Figure